Feb. 17, 1948.  G. A. MINER  2,436,050
PLATFORM TYPE SHOE AND METHOD OF MAKING SAME
Filed Aug. 22, 1945  5 Sheets-Sheet 1
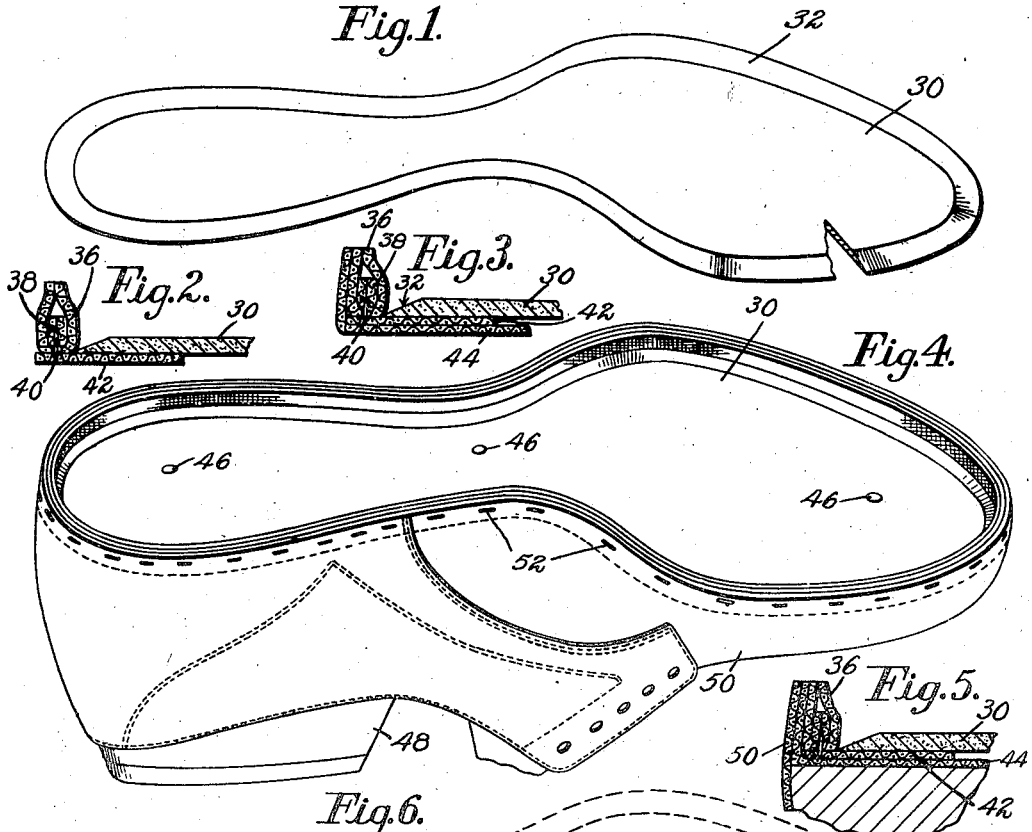
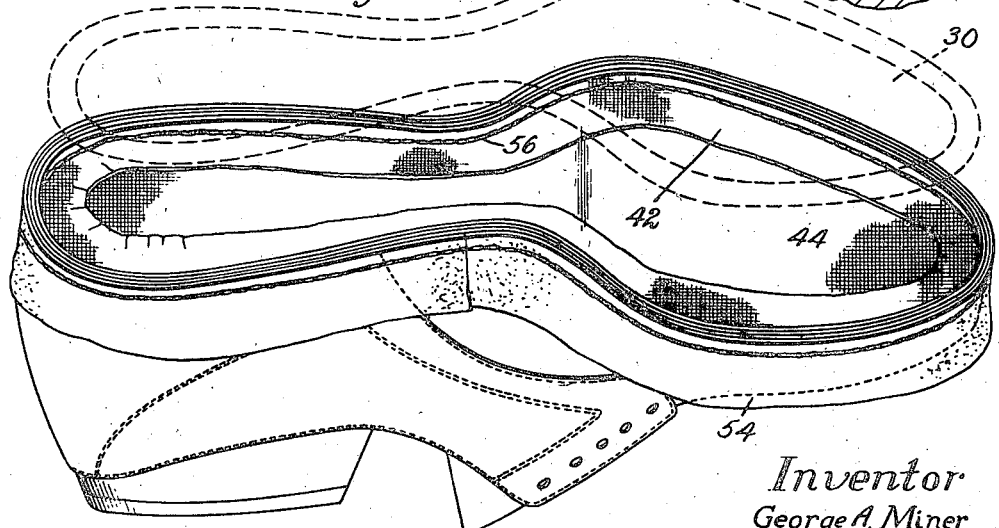
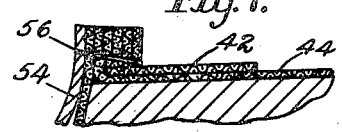
Inventor
George A. Miner
By his Attorney Feb. 17, 1948.  G. A. MINER  2,436,050
PLATFORM TYPE SHOE AND METHOD OF MAKING SAME
Filed Aug. 22, 1945  5 Sheets-Sheet 2
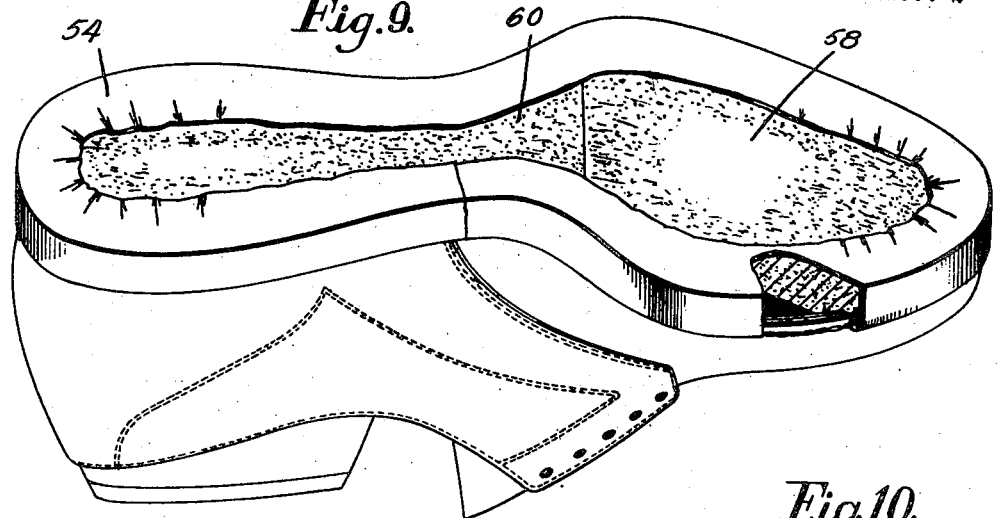
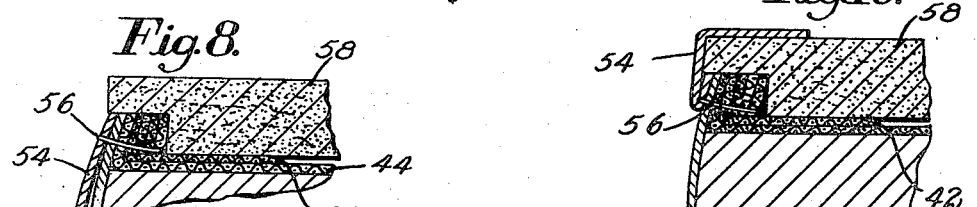
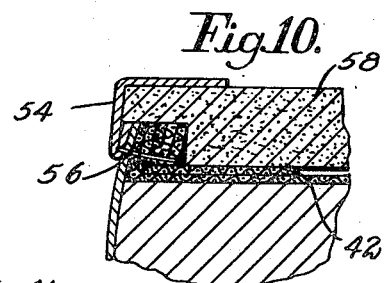
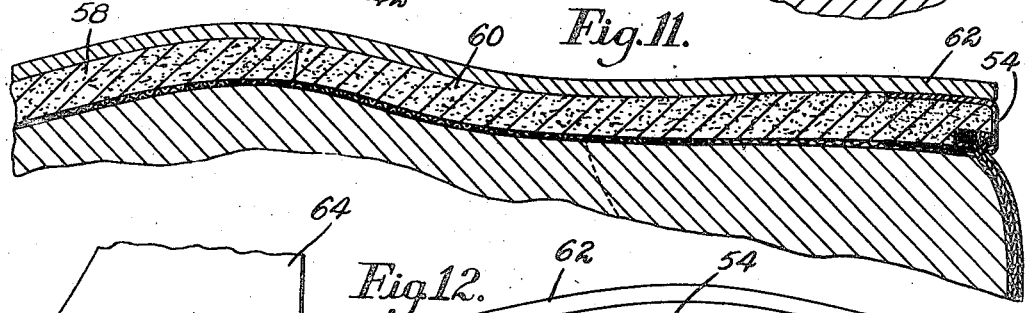
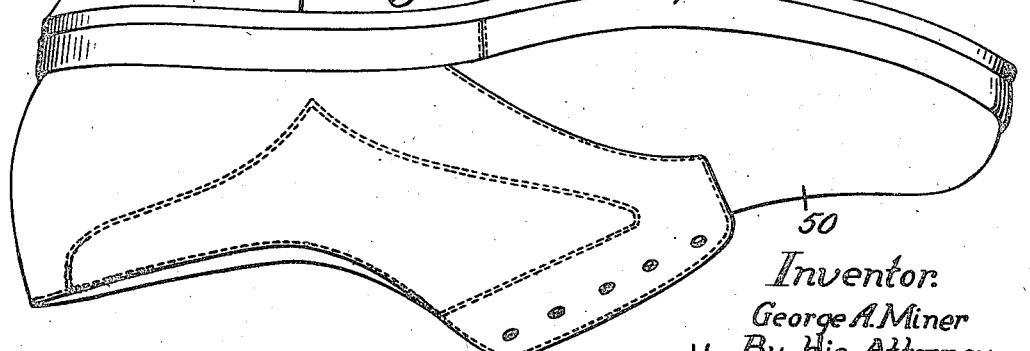
Inventor.
George A. Miner
By his Attorney

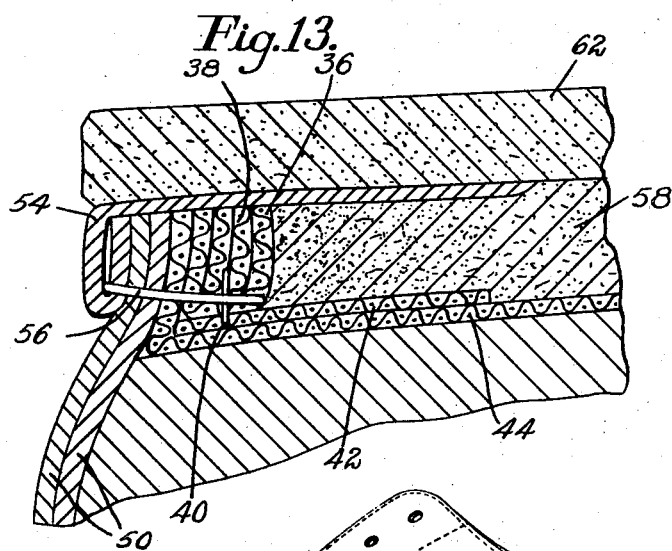
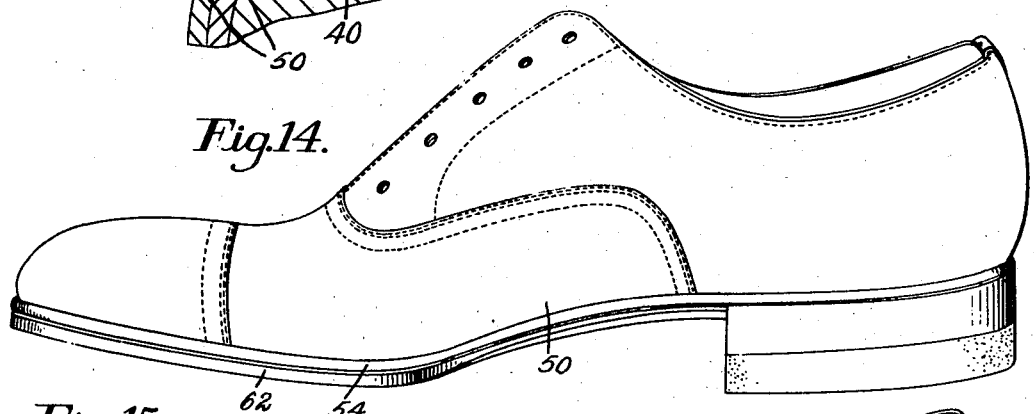
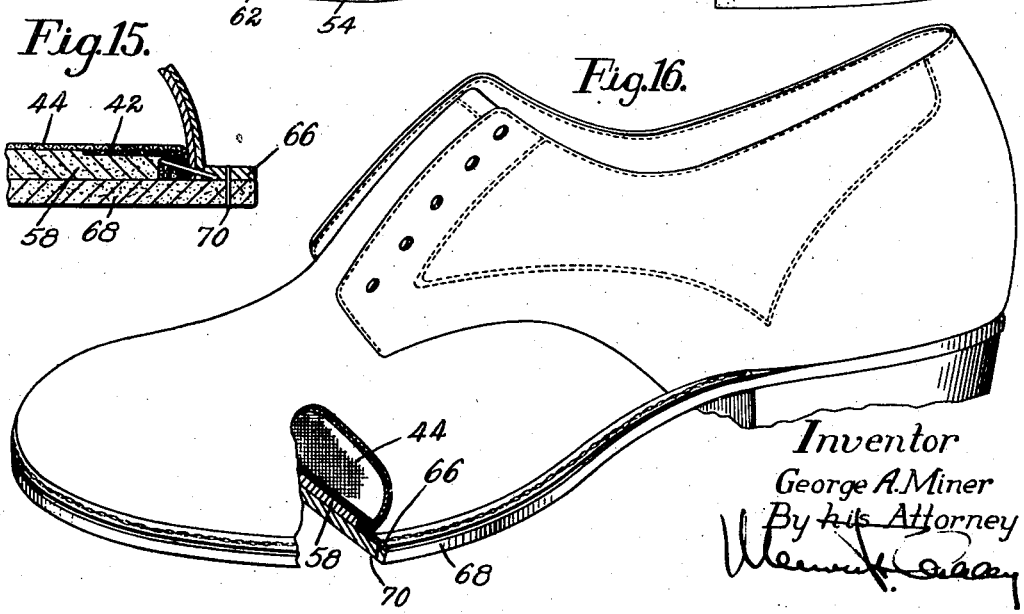

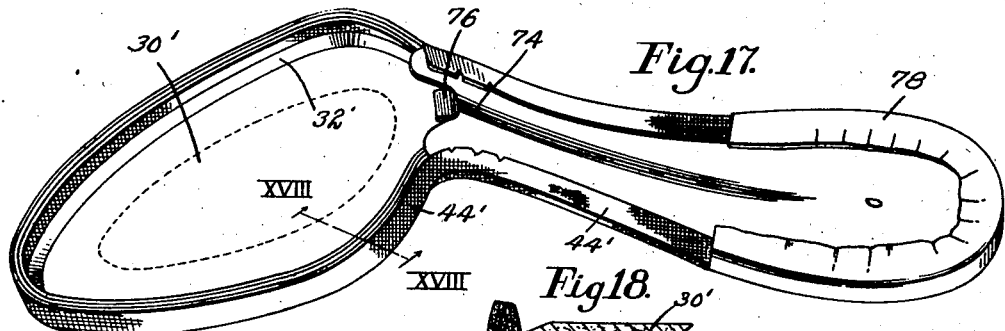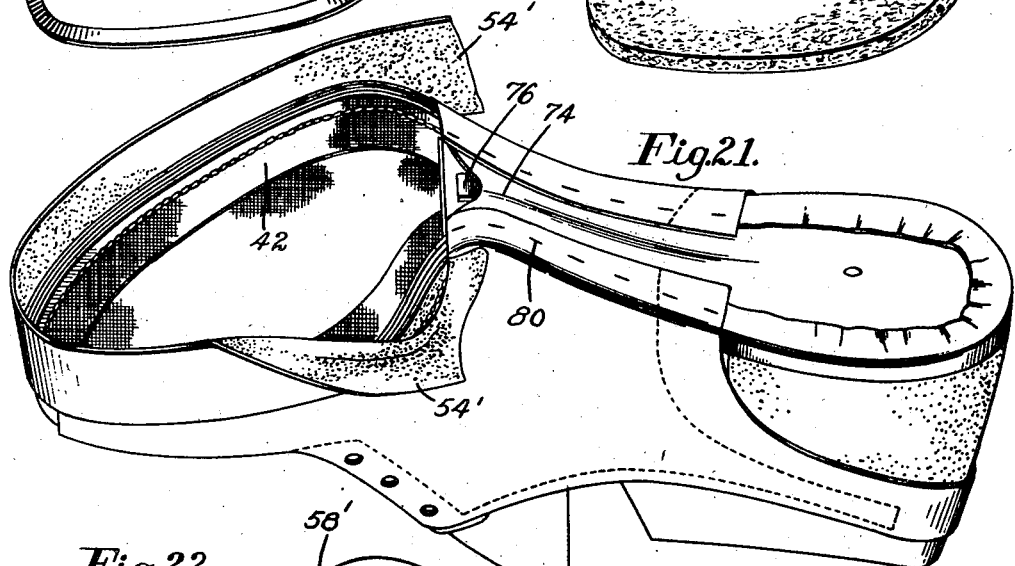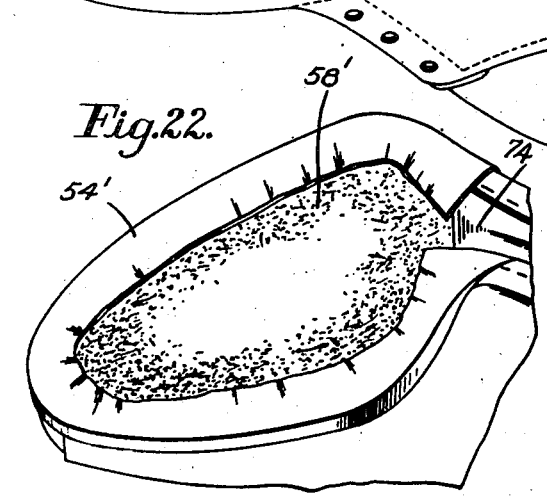

Feb. 17, 1948.    G. A. MINER    2,436,050
PLATFORM TYPE SHOE AND METHOD OF MAKING SAME
Filed Aug. 22, 1945    5 Sheets-Sheet 5
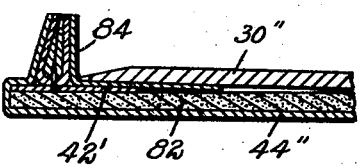
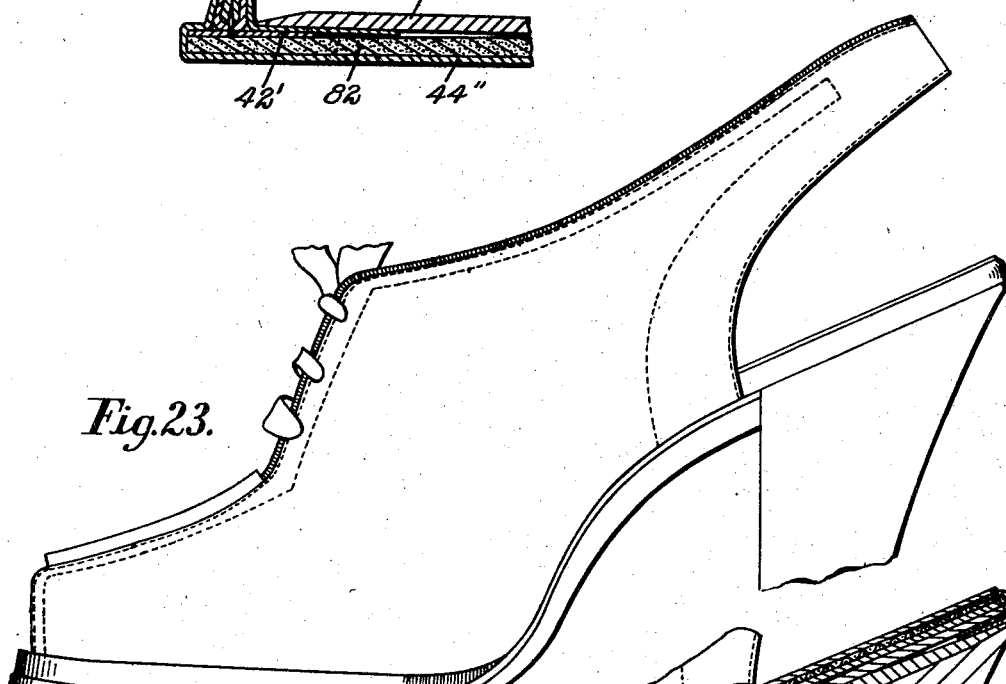
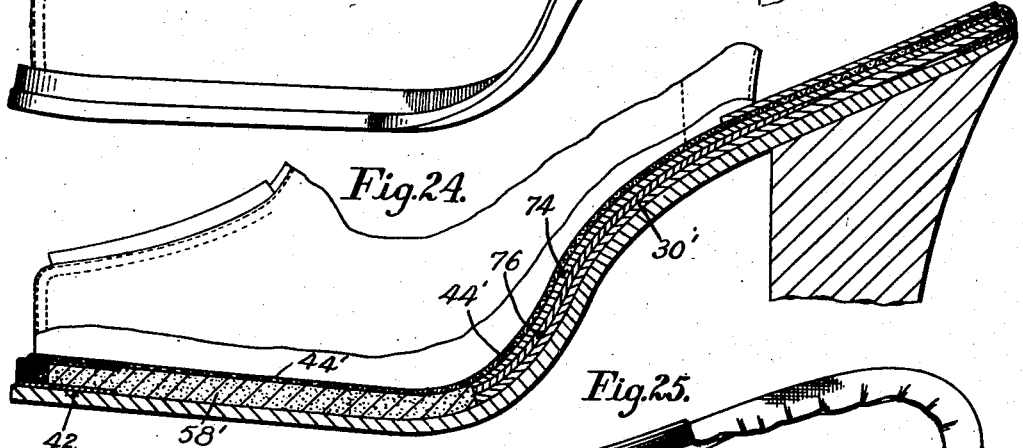
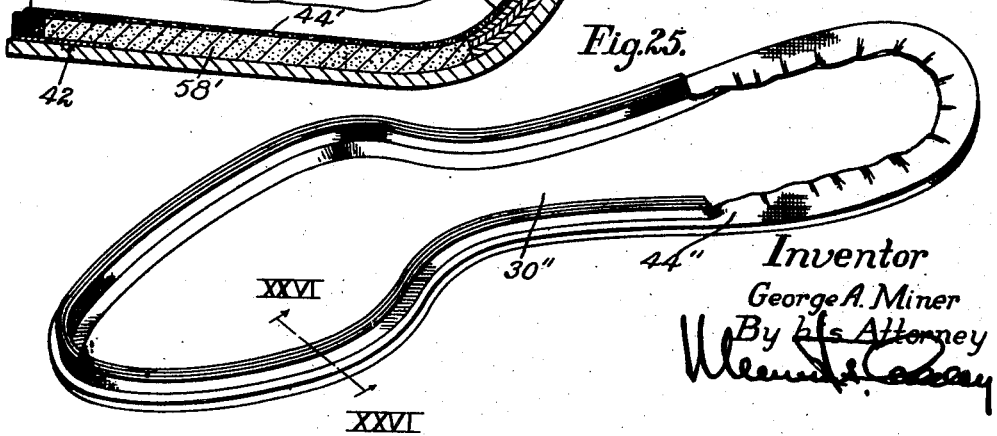

Patented Feb. 17, 1948

2,436,050

UNITED STATES PATENT OFFICE 2,436,050

PLATFORM TYPE SHOE AND METHOD OF MAKING SAME

George A. Miner, Manchester, N. H., assignor to United Shoe Machinery Corporation, Flemington, N. J., a corporation of New Jersey Application August 22, 1945, Serial No. 611,956

20 Claims. (Cl. 36—19.5)

This invention relates to shoes and to methods of making the same.

Objects of the invention are to provide a method whereby well lasted shoes of the welt or platform type and shoes having a forepart platform only may be made.

Other objects of the invention are to provide shoes of the welt or platform type which will be flexible, comfortable and durable.

With these objects in view, the invention provides a method by which the thick, heavy and relatively stiff innersole is eliminated in the completed shoe and soft flexible material substituted therefor, thereby producing a shoe in which the chief resistance to bending is offered by the outsole and a yielding cushion for the foot is provided.

In practising the present method, a temporary insole of relatively firm and stiff material, such for example as leatherboard, is provided, the insole being slightly smaller than the last bottom and preferably reduced to a feather edge about its marginal portion. To the marginal portion of this insole a ribbed strip having an attaching flange is attached, preferably by a cement which will permit subsequent stripping of the insole from the flange. This ribbed strip may assume various forms, as will be hereinafter explained, and, as illustrated herein, is provided with an inner flange only. Preferably the flange of the ribbed strip is attached to the inner face of the marginal portion of the temporary insole. The inner face of this assembly is covered with sock lining material such as fabric which is large enough to extend to the top of the rib and is cemented to the inner face of the flange and to the rib. The insole thus prepared is attached to the bottom of a last, the parts being so proportioned that the rib with its covering of sock lining material will be substantially flush with the edge of the last bottom. An upper of usual construction is assembled upon the last and may be pulled over in the usual manner. The upper is then tensioned and secured to the rib of the insole. The attachment of the lasted upper to the rib may be effected by cement, binding wire or by the use of the usual staple lasting machine.

The upper may be permanently attached to the rib of the insole by any suitable type of shoe sewing machine, the machine being preferably arranged to introduce into the seam a cover strip which may be either a platform cover or a welt. Due to the fact that the temporary insole has a reduced edge, the stitches may be placed very close to the bottom of the rib and thus a tight inseam is produced.

After the sewing operation, the upstanding rib formed by marginal portions of the sole-attaching strip, the upper, sock lining and the rib of the insole may be trimmed, the amount trimmed off depending upon the thickness of the filler material which it is desired to use.

Since the temporary insole has now performed its function of giving shape to the insole rib and taking the strains incident to the lasting operation, it is now removed, the tension imparted to the upper in lasting and inseaming being retained by the sock lining which is still cement-bonded to the inner face of the flange of the ribbed strip. The space enclosed by the rib may now be filled, with material such as felt, flush with the top of the rib, and the cover strip which has been attached to the shoe by the inseam laid over the inseam and the filler, thus forming a finished bead about the periphery of the shoe, and an outsole cement-attached to the overlaid cover strip.

If a more pronounced platform effect is desired, a thicker piece of felt substantially the size of the last bottom may be employed, the margin thereof being rabbeted to provide a portion to extend into and fill the space outlined by the ribs and having a portion extending over the inseam to provide a usual platform effect when the cover strip is laid over the platform and an outsole attached. Obviously a separate filler and an unrabbeted platform sole may be used and the platform may be varied in size, material and thickness. For example, a very thin platform may be used to give a bead effect above the outsole.

If desired, in place of the cover strip a welt of usual form may be attached in the inseaming operation, the shoe filled with felt or the like and an outsole attached to the welt by cement or the usual outsole stitching. In case an insole having a stiff shank and heel portion is desired, the felt filler may be stiffened, for example with pyroxylin.

If a welt or platform construction is desired only at the forepart of the shoe, the ribbed strip may be applied only to the forepart of the insole and after the inseaming operation the insole may be cut off substantially at the ball line, the forepart removed, a cushion filler substituted therefor, and the rear part allowed to remain in the shoe to provide a usual insole over which the shank and heel portions of the upper may be lasted in the usual manner.

In the drawings,

Fig. 1 is a perspective view of the temporary insole;

Fig. 2 is a sectional detail showing a ribbed strip attached to the inner marginal surface of the insole;

Fig. 3 is a similar view showing the outer face of the rib and the inner face of the insole covered with sock lining material;

Fig. 4 is a perspective view of a shoe upper upon a last with the upper lasted to the rib of the insole;

Fig. 5 is a sectional detail of the shoe shown in Fig. 4;

Fig. 6 is a view similar to Fig. 4 after the cover strip has been secured to the shoe by an inseam and the temporary insole (shown in dotted lines) removed;

Fig. 7 is a sectional detail of the shoe shown in Fig. 6;

Fig. 8 is a sectional detail of the shoe after a platform sole has been applied to the shoe bottom;

Fig. 9 is a perspective view of the shoe after the cover strip has been laid over upon the bottom of the platform;

Fig. 10 is a sectional detail of the shoe shown in Fig. 9;

Fig. 11 is a partial longitudinal section of the shoe after attachment of the outsole;

Fig. 12 is a side elevation of the completed shoe;

Fig. 13 is a sectional detail showing a modification of the shoe construction;

Fig. 14 is a side elevation of a shoe embodying the construction of Fig. 13;

Fig. 15 is a modification in which the cover strip is in the form of a usual welt;

Fig. 16 is a perspective view of a shoe embodying the construction of Fig. 15;

Fig. 17 is a perspective view of an insole in the use of which the present invention is practiced in the forepart only;

Fig. 18 is a detail sectional view on the line XVIII—XVIII of Fig. 17;

Fig. 19 illustrates the part of the insole which is to be removed from the insole of Fig. 17;

Fig. 20 is a view of the filler piece which is to be substituted for the part removed;

Fig. 21 is a perspective view of the shoe in process of construction over the insole of Fig. 17;

Fig. 22 is a view of the forepart of the shoe shown in Fig. 21 with the cover strip laid over the filler;

Fig. 23 is a side elevation of a completed shoe having a platform forepart;

Fig. 24 is a longitudinal section of the shoe shown in Fig. 23;

Fig. 25 is a perspective view of an insole for welt shoes embodying my invention; and Fig. 26 is a sectional detail on the line XXVI—XXVI of Fig. 25.

In practicing the present invention, a temporary insole, layer or body portion 30 (Fig. 1) is first prepared, the insole having the shape of the last bottom but being slightly smaller. The insole may be made of any firm shape-retaining material such, for example, as fiberboard. While the insole may remain in the shoe as a permanent part thereof, it is preferable to remove it, in which case it may be used repeatedly and more expensive material such as synthetic plastic may be employed.

The marginal portion of the insole 30 is preferably skived or beveled on its outer face at 32 to a feather edge, and to the marginal portion of its inner face is attached the flange of a ribbed strip (Fig. 2). This ribbed strip may be similar to that disclosed in United States Letters Patent No. 2,288,448, granted June 30, 1942, and No. 2,381,950, granted August 14, 1945, upon applications of Stanley M. Griswold, except that the outer flange is preferably omitted; that is, in forming the ribbed strip two strips of canvas, one a wide strip 36 and the other a narrow strip 38, are secured along their central portions by stitches 40 to the extreme marginal portion of a third strip 42, the free marginal portions of the strips 36, 38 being then folded up against each other and cemented together to form a rib, the strip 42 forming the flange.

After securing, preferably by cement, the flange 42 to the marginal portion of the inner face of the insole 30, as shown in Fig. 2, the inner face of the insole and the outer face of the rib are covered with sock lining material 44 cut enough larger than the last bottom so that when cemented to the inner face of the insole its marginal portion can be folded against and secured to the outer face of the rib and will preferably reach the top thereof, as illustrated in Fig. 3. The flange 42 is thus held by a double cement bond, one to the temporary insole 30 and the other to the sock lining 44. The temporary insole 30 is preferably made just enough smaller than the last bottom so that when the insole is completed, as above described, it will fit the last bottom, that is, the outer face of the rib will be flush with the edge of the last bottom.

The insole is now attached by tacks 46 to the bottom of a last 48 (Fig. 4) and a usual upper 50 assembled thereon. The upper may be pulled over if desired and the marginal portion of the upper tensioned and secured to the rib of the insole by cement or by staples 52. The upper 50 may then be trimmed, if desired, flush with the top of the rib, the lasted shoe then appearing as shown in Fig. 4 and in cross-section in Fig. 5.

The shoe is now ready for inseam sewing and preferably the simultaneous attachment of a cover strip 54, such as a platform cover or welt by a seam 56. This operation may conveniently be performed on a shoe-sewing machine having a strip guide, for example a machine such as that disclosed in Letters Patent of the United States No. 1,909,172, granted May 16, 1933, on application of Andrew Eppler, or preferably on a lockstitch machine such as that disclosed in Letters Patent of the United States No. 473,870, granted April 26, 1892, in the names of French and Meyer.

The skived marginal portion 32 of the temporary insole 30 enables the inseam stitches 56 to be placed close to the base of the rib so that the upper will be firmly held in finally lasted position, reaction of the upper being prevented by the attachment of the flange 42 of the ribbed strip to the temporary insole as well as by the sock lining 44 which also is attached to the flange 42.

The temporary insole 30, having now served its purpose of imparting last bottom shape to the rib and sock lining and of taking the strains incident to the lasting and sewing operations, is removed and the inseam trimmed. This trimming may be done at different heights, depending on the thickness of cushioning material desired. For example, the rib may be left high in the forepart and trimmed to a less height in the shank. If desired, the trimming may be done between the staples 52 and the stitches 56, the staples being thus removed. The condition of the shoe is now as represented in Fig. 6, the insole 30 being shown in dotted lines. A section of the shoe at this stage is shown in Fig. 7.

A platform sole 58 of felt or other suitable flexible and yielding material is now placed upon the shoe bottom, as indicated in Fig. 8. The size of the platform will depend upon the amount of sole extension desired. As herein shown, the size is such that little or no extension is provided. That is, the sole is substantially the shape and size of the last bottom. The marginal portion of the platform may be skived or rabbeted to fit neatly inside of and over the inseam, as indicated.

The platform and filler may be made entirely of yielding material which is especially desirable at the forepart. If, however, a relatively stiff shank portion is desired, the shank-and-heel portion of the platform, such as the part 60 (Fig. 11), may be of stiff material or the shank-and-heel portion, if made of absorbent material such as felt, may be impregnated with stiffening material such as pyroxylin or polyvinyl resin cement which, when dry, will impart the desired stiffness to the shank-and-heel portion of the platform.

The marginal portion of the cover strip 54, if it is a platform cover, is next laid over and cemented to the bottom surface of the platform 58, 60, as shown in Fig. 9. A section of the shoe at this stage is illustrated in Fig. 10.

The overlaid portion of the platform cover strip 54 may be roughened and cemented and an outsole 62 cement-attached in the usual manner, as illustrated in Fig. 11. The heel 64 is then attached, the completed shoe being illustrated in Fig. 12.

In case a less pronounced platform effect is desired, a very thin platform of firm material may be employed about which to wrap the cover strip 54, thereby producing a bead effect about the shoe above the outsole. Moreover, only the portion of the platform enclosed by the rib may be used. In this case the platform cover strip 54 will be laid over the trimmed edge faces of the ribbed material and onto the platform or filler which lies inwardly beyond it. A shoe so made is represented in section in Fig. 13 and the completed shoe in Fig. 14.

If a flexible welt shoe without the conventional leather insole is desired it is only necessary to provide a welt 66 in place of the platform cover strip 54, as indicated in Fig. 15, where, after removal of the temporary insole 30, a soft filling 58 is put in, a usual outsole 68 laid on the shoe and the welt 66 sewed to the outsole 68 by stitches 70, the completed shoe appearing as illustrated in Fig. 16.

The method illustrated in Figs. 13 and 14 lends itself readily to the manufacture of women's shoes with cushion foreparts and the usual rigid shanks. The insole used may have an all-over layer 30', a shank-and-heel piece 74 with a steel shank 76 between the plies and may be molded to proper shape as disclosed in United States Letters Patent No. 2,065,464, granted December 22, 1936, in the name of John M. Whelton. The layer 30' of this insole may be beveled about the forepart at 32' (Fig. 17) and the flange 42 of a ribbed strip attached thereto about the forepart only. The insole, at least as far back as the breast line, is then covered by the sock lining 44' which is attached to the flange 42 and to the outer face of the rib at the forepart and at the shank is laid over upon the outer face of the insole. The heel end, if the shoe is to have an open heel, may be bound by a strip 78 of material to provide the desired finish for the exposed portion of the insole. About the forepart the upper is lasted to the rib, as above explained, and at the shank is laid over and secured to the outer face of the insole by cement or staples 80 (Fig. 21). The forepart is inseamed and a cover strip 54 attached, this strip extending about the forepart only. The forepart of the insole is separated from the shank just back of the ball line and the forepart removed, as indicated by 30' (Fig. 19). In place of the part 30' a similarly shaped part 58' (Fig. 20) of felt is put in and the cover strip 54' laid over and secured to it, as indicated in Fig. 22. After the portions of the cover strip and upper which underlie the shoe bottom have been roughened and cemented, the shoe is ready to receive the outsole and heel which are attached in the usual manner, the completed shoe being as shown in Fig. 23 and in longitudinal section as shown in Fig. 24.

If a welt insole having a feather is desired, it may be made in accordance with my invention as shown in Figs. 25 and 26. Starting with a temporary insole 30" which is like the insole 30 but smaller from the breast line forwardly by approximately an eighth of an inch or the width of the feather, the flange 42' of the ribbed strip is attached thereto as before. Then an insole 82 having substantially the size and shape of the last bottom is cemented to the flange 42' with its marginal portion projecting beyond the rib a uniform distance from the breast line around the forepart to the breast line, this projection constituting the feather of the insole and being of the width of the usual feather. A sock lining 44" somewhat larger than 44 is cemented to the inner face of the insole 82, carried around the edge and feather portion and laid against the outer face of the rib (Fig. 26).

If desired, the ribbed strip may be provided with a reinforcement 84, as shown in Fig. 26, this ribbed strip being similar to that disclosed in United States Letters Patent No. 2,381,951, granted August 14, 1945, upon application of Stanley M. Griswold.

With the insole mounted upon a last, a shoe upper may be assembled thereon and the usual lasting, welting and trimming operations performed. Then the temporary insole 30" is removed by cutting it off either at the breast line or ball line as desired, a cushion filler applied in place of it, and an outsole laid and attached to the welt, thus producing a welt shoe having a yielding flexible cushion under the foot and one in which the resistance to bending is due almost entirely to the outsole, the shoe thus having flexibility approximating that of a turn shoe while also possessing the ease of a cushion sole and the insulating and foot-protecting attributes of a usual welt shoe.

Having thus described my invention, what I claim as new and desire to secure by Letters Patent of the United States is:

1. A shoe having a ribbed strip about the periphery of the shoe bottom, a sock lining secured to the inner face of the strip and to the outer face of the rib, a cover strip secured with an upper to the sock lining and rib, a cushion underlying the sock lining to the outer marginal portion of which the marginal portion of the cover strip is secured, and an outsole secured to the cover strip.

2. A shoe having an upper, a ribbed strip, a sock lining, a cover strip, a seam uniting the edges of the upper, sock lining, ribbed strip and cover strip, a cushion filler engaging the sock lining inside of said seam, a free marginal portion of said cover strip underlying said seam and the marginal portion of said filler, and an outsole underlying and secured to the cover strip.

3. A shoe having an upper, a sock lining, a cover strip, and a peripheral rib attached to said sock lining, said rib, sock lining, upper and cover strip being connected by a seam, a cushion material filling the space within said seam to the height of the rib, the marginal portion of the cover strip underlying said seam, rib and filler, and an outsole secured to the cover strip.

4. A shoe having a sock lining, an upper, a platform sole, a cover strip, a flanged ribbed strip secured to the sock lining, said sock lining covering the outer face of the rib, a seam connecting the rib, sock lining, upper and cover strip, the platform sole underlying the shoe bottom, a marginal portion of the cover strip underlying the platform, and an outsole secured to said marginal portion.

5. A shoe having a sock lining, an upper, a platform sole, a cover strip, an outsole, a flanged ribbed strip extending about the periphery of the sock lining, the flange of the strip being secured to the sock lining, and a seam connecting the rib, the upper and the cover strip, the platform sole underlying the sock lining with a portion thereof filling the space inside the rib, a marginal portion of the cover strip underlying the platform and the outsole being secured to said marginal portion.

6. A shoe comprising an upper, an outsole, a platform sole, a cover strip, a sock lining, and a flanged ribbed strip extending about the periphery of the sock lining, the sock lining being secured to the flange of the strip and to the outer face of the rib, the rib, the sock lining, the cover and the cover strip being sewed together, the platform sole underlying the sock lining, the cover strip underlying the platform, and the outsole being secured to the cover strip.

7. A shoe having a two-ply insole in the shank and heel portion thereof, a steel shank between said plies, a sock lining covering the inner face of said insole and the edge and marginal portion of its outer face, an upper lasted over said marginal portion, a flanged ribbed strip secured to the sock lining about the periphery of the forepart, the upper and a cover strip being inseamed to the rib about the forepart, a cushion member underlying the forepart over which the free marginal portion of the cover strip is laid, and an outsole secured to said strip at the forepart and to said lasted upper in the shank.

8. A shoe having a shank and heel piece, a full-length sock lining having the rear portion of which covers the inner face and marginal portion of the outer face of the shank and heel piece, an upper lasted over the shank and heel piece, a flanged ribbed strip having its flange secured to the sock lining, said sock lining covering the outer face of the rib, the upper at the forepart being attached with a platform cover strip to the sock lining and rib, filling material within the space outlined by the rib, said cover strip underlying said rib and filling material, and an outsole secured by adhesive to the cover strip at the forepart and to the upper at the shank.

9. That improvement in methods of making shoes which consists in providing a temporary insole smaller than the last bottom having attached thereto a ribbed strip and a covering of flexible material over the inner face of the insole and the outer face of the rib, lasting the upper to the rib, attaching a cover strip and the upper to the rib of the insole, removing the temporary insole, filling the space inside the insole rib with yielding material, laying the cover strip over upon the filling material, and attaching an outsole to the cover strip.

10. That improvement in methods of making shoes which consists in providing a temporary insole smaller than the last bottom having attached thereto a ribbed strip and a covering of flexible material over the inner face of the insole and the outer face of the rib, lasting the upper to the rib, attaching a cover strip and the upper to the rib of the insole, removing the temporary insole, applying a platform of yielding material to the shoe bottom, laying the cover strip over upon the platform, and attaching an outsole to the cover strip.

11. That improvement in methods of making shoes which comprises providing a temporary insole having attached thereto a ribbed strip and a covering of sock-lining material over the inner face of the insole and the outer face of the rib, associating an upper with the insole, applying a cover strip to the outer face of the upper, sewing a seam through the rib, the upper and the cover strip, removing the insole, placing a layer of cushion material upon the shoe bottom, laying the cover strip over upon the cushion material, and securing an outsole to the cover strip.

12. That improvement in methods of making shoes which comprises providing a temporary insole slightly smaller than the last bottom, said insole having a flanged ribbed strip the flange of which is cemented to the marginal portion of the insole and having a cover cemented to the inner face of the flange, the cover being large enough to cover also the outer face of the rib, assembling the insole and an upper upon a last, tensioning the upper and securing it to the insole, attaching together the rib of the insole, the cover, the upper and a cover strip by an inseam, removing the temporary insole, filling the cavity formed by the rib with yielding material, and attaching a sole to the cover strip.

13. That improvement in methods of manufacturing shoes which comprises providing a temporary insole smaller than the last bottom to one face of which is attached the flange of a flanged ribbed strip and a cover of sock lining material which also covers one face of the rib, assembling the insole and an upper on the last, tensioning the upper and securing it to the face of the rib covered by the sock lining, sewing a seam at the base of the rib through the rib, the sock lining, the upper and a cover strip, removing the temporary insole, placing on the shoe bottom a layer of cushion material substantially the size of the last bottom, laying the cover strip over upon said layer, securing it thereto, and attaching an outsole to the cover strip.

14. That improvement in methods of making shoes which comprises providing temporarily an insole slightly smaller than the last bottom to the inner face of which is attached the flange of a flanged ribbed strip, sock lining material being cemented to the inner face of the flange and the outer face of the rib, attaching a cover strip and upper to the rib of the insole by an inseam, removing the temporary insole, applying a platform sole of yielding material of last-bottom size to the shoe bottom, said platform having a portion shaped to fill the space inside the rib, laying the cover strip over the platform sole, and attaching an outsole to the cover strip.

15. That improvement in methods of making shoes which comprises providing a temporary insole having a reduced marginal portion to which is cemented the flange of a flanged ribbed strip, the inner face of the insole and the outer face of the rib being covered with sock-lining material, assembling the insole and an upper upon a last, tensioning the upper and securing it to the rib, applying a cover strip to the outer face of the upper, sewing a seam at the base of the rib through the rib, the upper and the cover strip, removing the temporary insole, placing a layer of cushion material upon the shoe bottom, laying the cover strip over upon the cushion material, and securing an outsole to the cover strip.

16. That improvement in methods of manufacturing shoes which comprises providing a temporary insole slightly smaller than the last bottom, the outer face of which is beveled to a thin edge, said insole having a flanged ribbed strip cemented to its inner marginal portion by its flange and having on its inner face a cover of sock lining material extending to the top of the attached rib, assembling the insole and an upper upon a last, tensioning the upper and securing it to the face of the rib covered by the sock lining, sewing a seam at the base of the rib through the rib, insole cover, upper and a cover strip, removing the temporary insole, filling the space inside the rib with cushion material, placing on the shoe bottom a layer of cushion material substantially the size of the last bottom, laying the cover strip over said layer, securing it thereto, and attaching an outsole to the shoe bottom.

17. That improvement in methods of making shoes which comprises providing an insole having at the forepart a flanged ribbed strip secured by its flange to the inner marginal portion of the insole, the inner face of the insole being covered with sock lining material including the outer face of the rib, the covering material at the shank being laid over the bottom of the insole, assembling the insole and an upper upon a last, lasting the upper at the forepart to the rib and at the shank to the outer face of the insole, attaching a cover strip to the rib and upper at the forepart only of the insole, removing the forepart of the insole and substituting a cushion material therefor, laying the cover strip over the cushion material, and attaching a sole to the cover strip in the forepart and to the upper in the shank.

18. That improvement in methods of making shoes which comprises providing an insole having the marginal portion of its forepart beveled, having a ribbed strip cemented to its forepart and having the inner face of the insole and the outer face of the rib covered with sock lining material, the covering material at the shank being laid over the bottom of the insole, assembling the insole and an upper upon a last, lasting the upper at the forepart to the rib and at the shank to the outer face of the insole, sewing a cover strip to the rib and upper at the forepart only of the insole by a seam located at the base of the rib, removing the forepart of the insole and substituting a cushioning material therefor, laying the cover strip over the cushioning material, and attaching a sole to the cover strip in the forepart and to the upper in the shank.

19. That improvement in methods of making shoes which comprises providing an insole having a ribbed strip attached to its forepart and having its inner face and the outer face of the rib covered with sock lining material, the covering material at the shank being laid over the edge and on to the marginal portion of the bottom of the insole, assembling the insole and an upper upon a last, lasting the upper at the forepart to the rib and at the shank to the outer face of the insole, attaching a cover strip to the rib and upper at the forepart only of the insole by a seam located at the base of the rib, removing the forepart of the insole and substituting therefor cushioning material having a thickness equal to the height of the rib, laying the cover strip over the rib and the cushioning material, and cement-attaching a sole to the cover strip in the forepart and to the upper in the shank.

20. That improvement in methods of manufacturing shoes which comprises providing a temporary insole slightly smaller than the last bottom having the outer face of the marginal portion of its forepart beveled, said insole having a flanged ribbed strip cemented by its flange to the inner marginal portion of the insole opposite the bevel, said insole having its inner face and the outer face of the rib covered with sock lining material, assembling the insole and an upper upon a last, tensioning the upper and securing it to the face of the rib covered by the sock lining, lasting the shank portion of the upper over the insole, sewing a seam at the base of the rib through the rib, insole cover, upper, and a cover strip about the forepart of the shoe, removing the beveled forepart of the temporary insole, placing on the shoe bottom a layer of cushion material substantially the size of the portion of the insole removed and of a thickness equal to the height of the rib, laying the cover strip over the rib and on to said layer, securing it thereto, and cement-attaching an outsole to the cover strip at the forepart and to the lasted upper at the shank.

GEORGE A. MINER.

REFERENCES CITED

The following references are of record in the file of this patent:

UNITED STATES PATENTS

| Number | Name | Date |
|---|---|---|
| 2,381,951 | Griswold | Aug. 14, 1945 |
| 2,380,146 | Braun | July 10, 1945 |
| Re. 22,695 | Fern | Nov. 27, 1945 |
| 2,391,437 | Moskowitz et al. | Dec. 25, 1945 |
| 2,341,676 | Walsh | Feb. 15, 1944 |
| 2,407,224 | Chandler | Sept. 10, 1946 |